No. 642,675. Patented Feb. 6, 1900.
I. S. CAROLUS.
WIND ESCAPE ATTACHMENT FOR THRESHING MACHINE BLOWERS.
(Application filed Aug. 19, 1898.)
(No Model.)
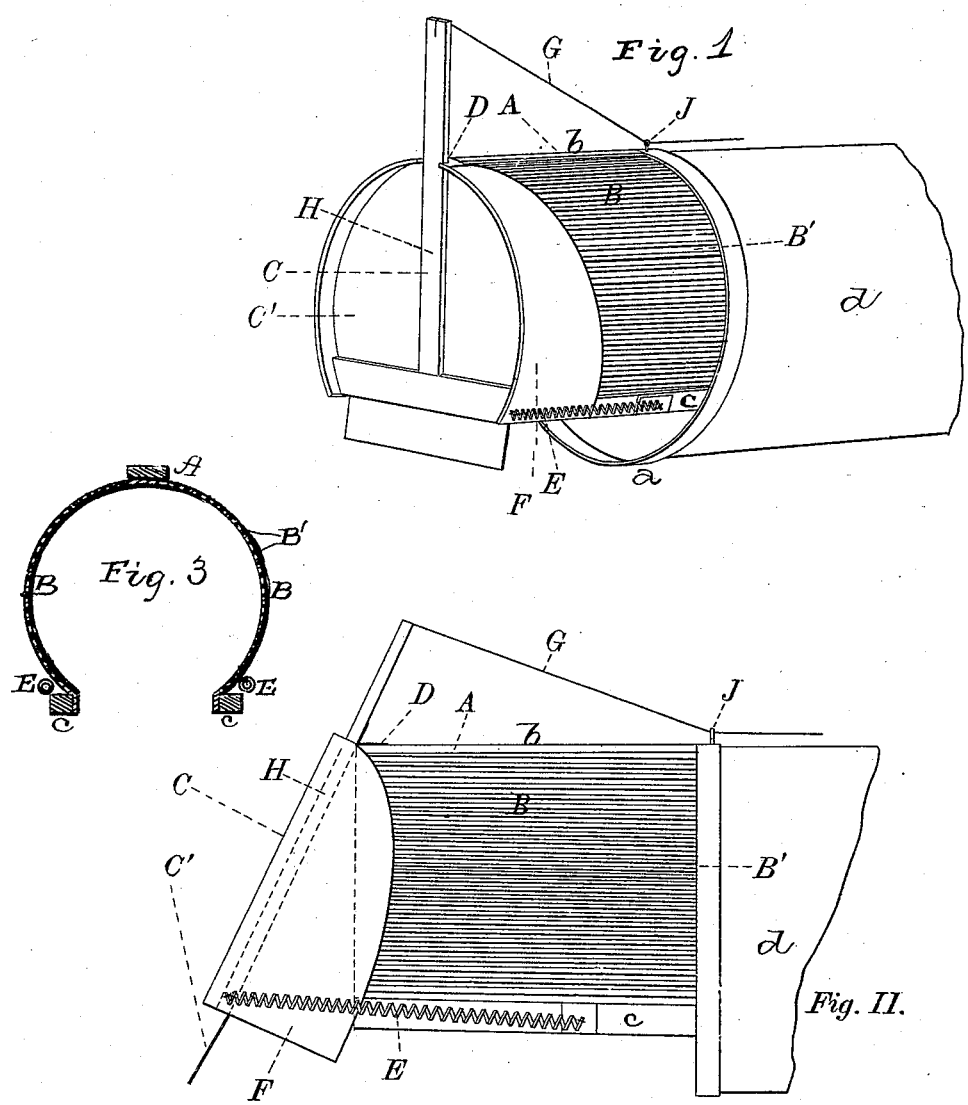
Witnesses;
Fred W. Honens
C. L. Manahan
Inventor,
Isaac S. Carolus
by M. J. Manahan,
Attorney.

UNITED STATES PATENT OFFICE.

ISAAC S. CAROLUS, OF STERLING, ILLINOIS.

WIND-ESCAPE ATTACHMENT FOR THRESHING-MACHINE BLOWERS.

SPECIFICATION forming part of Letters Patent No. 642,675, dated February 6, 1900.

Application filed August 19, 1898. Serial No. 689,015. (No model.)

*To all whom it may concern:*

Be it known that I, ISAAC S. CAROLUS, a citizen of the United States, residing at Sterling, county of Whiteside, and State of Illinois, have invented certain new and useful Improvements in Wind-Escape Attachments for Threshing-Machine Blowers; and I do declare the following to be a full, clear, and exact description of the invention, such as will enable others skilled in the art to which it appertains to make and use the same, reference being had to the accompanying drawings, and to the letters of reference marked thereon, which form part of this specification.

My invention has reference to a wind-escape attachment for threshing-machine blowers. The purpose of such blowers is to carry the straw and chaff away from the threshing-machine and deposit them in stacks.

By the use of my wind-escape attachment the fine straw and chaff, as well as the coarser, can be deposited wherever desired.

My invention is so constructed that it can be made as the end section of the blower or be attached to the blowers now in use.

I accomplish the results aforesaid by the mechanism illustrated in the accompanying drawings, in which—

Figure 1 is a perspective of my invention. Fig. 2 is a side elevation of the same. Fig. 3 is a vertical section taken through the sieve B.

Similar letters refer to similar parts in both views.

Referring to the drawings, A is the frame of the wind-escape, to which is suitably secured the cylindrically-formed sieve or grating B. The openings in the sieve or grating B should be small enough to prevent the passage of the straw and chaff and can be constructed of any suitable material having openings B' sufficiently small for the above purpose. About one-third of the under part of the sieve or grating B is cut away to allow the straw to drop onto the stack.

C is a hood or lid composed of the resisting-head C and the frame to which it is suitably attached. Said hood C is hinged to the upper forward portion of the frame A at D and held in place and regulated by means of two coiled springs E E, situated one on each side of the hood C, with their ends respectively secured to the front of the frame of the hood C and the lower portion of the frame A, as shown. The hood C is also provided with the shields F, which protect the springs E E from filling with chaff and also assist the head C' in resisting the wind.

The head C' and the shields F are made of sheet-iron or other suitable material strong enough to resist the current of air as it comes forth from the blower carrying the straw and chaff.

The frame A comprises an annular ring or thimble $a$, a top bar $b$, and a pair of bottom bars $c$. The thimble $a$ is designed to fit over the end of the pneumatic tube $d$ of the blower, the top bar $b$ supporting the hinge carried by the upright H, and the bottom bars $c$ constitute the terminals of the arc-shaped series of longitudinal bars and serve to retain the inner ends of the springs.

The position of the hood C in reference to the frame A is also regulated by means of a wire G, which is fastened to the upright H of hood C and passed through the loop J to the rear of the machine, from where the operator may adjust the said hood to any required angle.

The operation of my invention is as follows: As has been hereinbefore stated, my wind-escape attachment can be made on the last section of the blower or attached to the blower as it is now in use. When my wind-escape has become a part of the blower, either by attachment by suitable means or made as part of the blower itself and the blower set in operation, the wind carrying the straw and chaff comes forth from the mouth of the blower and meets the resisting-head C' of hood C. This breaks the force of the wind somewhat as well as changes its course, and it is compelled to escape through the openings B' of the sieve or grating B. As said openings B' are too small for the straw and chaff to be forced through, they drop down onto the stack through the opening in the under side of B, provided for that purpose. When the stack is beginning to be formed, the hood C is placed at the angle shown in Fig. 2; but as the height of the stack increases the hood C can be raised by means of the hinge at D and the wire G passing through J into the hand of the operator, and the straw can be consequently thrown to a great distance and height, the springs E serving to return the head to the vertical position shown in Fig. 1 as soon as it is left free to move.

What I claim as my invention, and desire to secure by Letters Patent of the United States, is—

1. A wind-escape attachment for threshing-machine blowers comprising a pneumatic tube and a cylindrically-formed sieve that is open at its bottom, combined with a segmental spring-actuated hood closing the end of the sieve, and provided with curved shields surrounding a portion of the sieve, and a head depending below the sieve, substantially as specified.

2. A wind-escape attachment for threshing-machine blowers comprising a frame, a sieve composed of longitudinally-parallel bars arranged in an arc-shaped series, a segmental hood closing the end of the sieve and provided with curved shields surrounding a portion of the sieve, and with a head depending below the sieve, substantially as specified.

3. A wind-escape attachment for threshing-machine blowers comprising a frame, a sieve composed of longitudinally-parallel bars arranged in an arc-shaped series, a segmental hood hinged to the frame at the top of the sieve, said hood being provided with curved shields surrounding portions of the sieve, an upright extending above the sieve and with a head extending below the sieve, springs connected to the frame and hood respectively and means for swinging the hood in opposition to the springs, substantially as specified.

In testimony whereof I affix my signature in the presence of two witnesses.

ISAAC S. CAROLUS.

Witnesses:
ALICE JOHNSON,
C. L. MANAHAN.